(12) United States Patent
Steele, Jr.

(10) Patent No.: US 6,961,744 B2
(45) Date of Patent: Nov. 1, 2005

(54) SYSTEM AND METHOD FOR GENERATING AN INTEGER PART OF A LOGARITHM OF A FLOATING POINT OPERAND

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 581 days.

(21) Appl. No.: 10/035,585

(22) Filed: Dec. 28, 2001

(65) Prior Publication Data
US 2002/0178197 A1 Nov. 28, 2002

Related U.S. Application Data

(60) Provisional application No. 60/293,173, filed on May 25, 2001.

(51) Int. Cl.[7] ............................ G06F 7/38; G06F 15/00
(52) U.S. Cl. ............................ 708/512; 708/517
(58) Field of Search ........................ 708/512, 517, 708/204

(56) References Cited

U.S. PATENT DOCUMENTS

| | | | |
|---|---|---|---|
| 3,725,649 A | | 4/1973 | Deerfield |
| 4,777,613 A | | 10/1988 | Shahan et al. |
| 4,788,655 A | | 11/1988 | Nakayama et al. |
| 4,991,131 A | | 2/1991 | Yeh et al. |
| 5,065,352 A | | 11/1991 | Nakano |
| 5,126,963 A | | 6/1992 | Fukasawa |
| 5,161,117 A | * | 11/1992 | Waggener, Jr. .............. 708/204 |
| 5,249,149 A | | 9/1993 | Cocanougher et al. |
| 5,307,303 A | | 4/1994 | Briggs et al. |
| 5,347,481 A | | 9/1994 | Williams .................... 364/748 |
| 5,347,482 A | | 9/1994 | Williams .................... 364/757 |
| 5,357,237 A | | 10/1994 | Bearden et al. |
| 5,363,321 A | * | 11/1994 | Dao Trong et al. ......... 708/517 |
| 5,365,465 A | * | 11/1994 | Larson ....................... 708/204 |
| 5,481,489 A | | 1/1996 | Yanagida et al. |
| 5,570,310 A | * | 10/1996 | Smith ......................... 708/517 |
| 5,666,301 A | | 9/1997 | Makino |
| 5,748,516 A | | 5/1998 | Goddard et al. |
| 5,812,439 A | | 9/1998 | Hansen |
| 5,862,066 A | | 1/1999 | Rossin et al. |

(Continued)

OTHER PUBLICATIONS

U.S. Appl. No. 10/320,547, filed Dec. 17, 2002, Steele, Jr.

(Continued)

*Primary Examiner*—Tan V. Mai
(74) *Attorney, Agent, or Firm*—Finnegan, Henderson, Farabow, Garrett, & Dunner, L.L.P.

(57) ABSTRACT

A logarithm unit computes an integer part of a logarithm of a floating point operand according to an embodiment of the present invention. The logarithm unit analyzes a format of the floating point operand and generates at least one signal representative of the format. The logarithm unit determines a magnitude of an unbiased exponent of the floating point operand as an intermediate result based on the at least one signal, wherein the unbiased exponent is represented by unbiased exponent bits. Still further, the logarithm unit determines an exponent field and a fraction field high part of the intermediate result. A result is assembled equaling the integer part of the logarithm of the floating point operand based on the at least one signal wherein, if the floating point operand is in at least one of a denormalized format, a normalized non-zero format, and a delimited format, an exponent field of the result equals the exponent field of the intermediate result and a fraction field high part of the result equals the fraction field high part of the intermediate result.

36 Claims, 7 Drawing Sheets

U.S. PATENT DOCUMENTS

| | | | |
|---|---|---|---|
| 5,892,697 | A | 4/1999 | Brakefield |
| 5,931,943 | A * | 8/1999 | Orup .......................... 712/222 |
| 5,953,241 | A | 9/1999 | Hansen et al. |
| 5,963,461 | A | 10/1999 | Gorshtein et al. |
| 5,978,901 | A | 11/1999 | Luedtke et al. |
| 5,995,991 | A | 11/1999 | Huang et al. |
| 6,009,511 | A | 12/1999 | Lynch et al. ................. 712/222 |
| 6,049,865 | A | 4/2000 | Smith |
| 6,105,047 | A | 8/2000 | Sharangpani et al. |
| 6,108,772 | A | 8/2000 | Sharangpani |
| 6,131,106 | A | 10/2000 | Steele, Jr. ................... 708/510 |
| 6,138,135 | A | 10/2000 | Karp |
| 6,151,669 | A | 11/2000 | Huck et al. |
| 6,189,094 | B1 | 2/2001 | Hinds et al. |
| 6,205,460 | B1 | 3/2001 | Steele, Jr. |
| 6,219,685 | B1 | 4/2001 | Story |
| 6,256,655 | B1 | 7/2001 | Ezer et al. |
| 6,360,189 | B1 | 3/2002 | Hinds et al. |
| 6,393,555 | B1 | 5/2002 | Meier et al. |
| 6,490,607 | B1 | 12/2002 | Oberman |
| 6,571,265 | B1 | 5/2003 | Story |
| 6,594,681 | B1 | 7/2003 | Prabhu |
| 6,629,120 | B1 | 9/2003 | Walster et al. |
| 6,658,443 | B1 | 12/2003 | Walster |
| 6,658,444 | B1 | 12/2003 | Walster et al. |
| 6,697,832 | B1 | 2/2004 | Kelley et al. |
| 6,732,134 | B1 | 5/2004 | Rosenberg et al. |
| 6,789,098 | B1 | 9/2004 | Dijkstra |
| 2002/0194232 | A1 | 12/2002 | Walster |
| 2003/0033335 | A1 | 2/2003 | Walster |

OTHER PUBLICATIONS

U.S. Appl. No. 10/320,450, filed Dec. 17, 2002, Steele, Jr.
U.S. Appl. No. 10/035,581, filed Dec. 28, 2001, Steele, Jr.
U.S. Appl. No. 10/028,375, filed Dec. 28, 2001, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
Title: "Safe Treatment of Overflow and Underflow Conditions", by Robert A. Fraley & J. Stephen Walther, Hewlett-Packard Co., pp. 1-5.
Title: "Vax Floating Point: A Solid Foundation for Numerical Computation", by Mary Payne & Dileep Bhandarkar, Digital Equipment Corp., pp. 1-12.
Title: Lecture Notes on the Status of "IEEE Standard 754 for Binary Floating-Point Arithmetic", by Prof. W. Kahan, May 31, 1996, pp. 1-30.
Title: "Interval Arithmetic Specification" by Dmitri Chiriaev & G. William Walster, Draft revised May 4, 1998, pp. 1-78.
Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.

* cited by examiner

FIG. 7

| ref | sign | exponent | fraction | | | | type |
|---|---|---|---|---|---|---|---|
| 710 | S | 00000000 | all zeroes | | | 0 | zero |
| 720 | S | 00000000 | all zeroes | | | 1 | underflow |
| 730 | S | 00000000 | not all zeroes | | | | denorm |
| 740 | S | mixed | any | | | | normalized nonzero |
| 750 | S | 11111110 | all ones | | | | overflow |
| 760 | S | 11111111 | all zeroes | N | O U Z | X | ∞ |
| 770 | S | 11111111 | not all zeroes | N | O U Z | X | NaN | msb — lsb|msb — lsb

SYSTEM AND METHOD FOR GENERATING AN INTEGER PART OF A LOGARITHM OF A FLOATING POINT OPERAND

Applicant claims the right of priority based on U.S. Provisional Patent Application No. 60/293,173 filed May 25, 2001 in the name of Guy L. Steele, Jr.

RELATED APPLICATIONS

U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, is hereby incorporated by reference.

DESCRIPTION OF THE INVENTION

1. Field of the Invention

This invention relates generally to systems and methods for performing floating point operations, and more particularly to systems and methods for generating the integer part of a logarithm of a floating point operand.

2. Background of the Invention

IEEE Standard 754 (hereinafter "IEEE Std. 754" or "the Standard") published in 1985 by the Institute of Electrical and Electronic Engineers, and adopted by the American National Standards Institute (ANSI), defines several standard formats for expressing values as a floating point number. In accordance with IEEE Std. 754, a floating point format is represented by a plurality of binary digits, or "bits," having the structure:

$$se_{msb} \ldots e_{lsb}f_{msb} \ldots f_{lsb}$$

where "msb" represents "most significant bit" and "lsb" represents "least significant bit." The bit string comprises a sign bit, s, which indicates whether the number is positive or negative. The bit string further comprises an exponent field having bits $e_{msb} \ldots e_{lsb}$ representing a biased exponent, e. Still further, the bit string comprises a fraction field having bits $f_{msb} \ldots f_{lsb}$ representing a fraction field of a significand. A significand comprises an explicit or implicit leading bit to the left of an implied binary point and a fraction field to the right of the implied binary point.

IEEE Std. 754 defines two general formats for expressing a value, namely, a "single" format, which comprises thirty-two bits, and a "double" format, which comprises sixty-four bits. In the single format, there is one sign bit, s, eight bits, $e_7 \ldots e_0$, comprising the exponent field, and twenty-three bits, $f_{22} \ldots f_0$, comprising the fraction field. In the double format, there is one sign bit, s, eleven bits, $e_{10} \ldots e_0$, comprising the exponent field, and fifty-two bits, $f_{51} \ldots f_0$, comprising the fraction field.

The value of a number represented in accordance with IEEE Std. 754 is determined based on the bit patterns of the exponent field bits, $e_{msb} \ldots e_{lsb}$, and the fraction field bits, $f_{msb} \ldots f_{lsb}$ both for the single and double formats. The value of a number represented in accordance with IEEE Std. 754 is positive or negative infinity, depending on the value of the sign bit, s, if the exponent field bits, $e_{msb} \ldots e_{lsb}$, are all binary ones (that is, if the bits represent a binary-encoded value of "255" in the single format or "2047" in the double format) and the fraction field bits, $f_{msb} \ldots f_{lsb}$, are all binary zeros. In particular, the value, v, of the number is $v=(-1)^s\infty$, where "∞" represents the value infinity. On the other hand, if the exponent field bits, $e_{msb} \ldots e_{lsb}$, are all binary ones and the fraction field bits, $f_{msb} \ldots f_{lsb}$, are not all zeros, then the value that is represented is deemed "not a number," abbreviated "NaN."

Further, if the exponent bits, $e_{msb} \ldots e_{lsb}$, are neither all binary ones nor all binary zeros (that is, if the bits represent a binary-encoded value between 1 and 254 in the single format or between 1 and 2046 in the double format), the number is in a "normalized" format and the value of the number is $v=(-1)^s 2^{e-bias}(1.|f_{msb} \ldots f_{lsb})$, where "|" represents a concatenation operation. That is, in the normalized format, a leading bit having the value "one" followed by a binary point and the fraction field bits is implied thereby increasing the size of the fraction field by one bit to twenty four bits in the single format and to fifty three bits in the double format. In effect, the fraction field represents a value greater than or equal to one and less than two.

Still further, if the exponent field bits, $e_{msb} \ldots e_{lsb}$, are all binary zeros and the fraction field bits, $f_{msb} \ldots f_{lsb}$ are not all zero, the number is in a "denormalized" format and the value of the number is $v=(-1)^s 2^{e-bias+1}(0.|f_{msb} \ldots f_{lsb})$. The range of values that can be expressed in the de-normalized format is disjoint from the range of values that can be expressed in the normalized format, for both the single and double formats.

Finally, if the exponent field bits, $e_{msb} \ldots e_{lsb}$, are all binary zeros and the fraction field bits, $f_{msb} \ldots f_{lsb}$, are all zeros, the value of the number is "zero". The value "zero" may be positive zero or negative zero, depending on the value of the sign bit.

IEEE Std. 754 generates floating-point status information for a particular floating point operation. The status information is normally represented by flags that are stored in a floating point status register. Status information may include: (1) information indicating whether a particular operand is invalid for the operation to be performed ("invalid operation"); (2) information indicating whether a divisor is zero when the operation to be performed is division, ("division-by-zero"); (3) information indicating whether an overflow occurred during the operation ("overflow"); (4) information indicating whether an underflow occurred during the operation ("underflow"); and (5) information indicating whether the rounded result of the operation is not exact ("inexact").

Because status information is represented by flags that are stored in floating point status registers, implicit serialization is required. It would be desirable to indicate a status of an operand or result within the operand or result, rather than representing the status by flags stored in floating point status registers. U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, describes a floating point unit that encodes floating point status information in the results generated by the floating point unit, which obviates the need for implicit serialization. The floating point unit includes a plurality of functional units, including an adder unit, a multiplier unit, a divider unit, a square root unit, a maximum/minimum unit, a comparator unit and a tester unit, all of which operate under control of functional unit control signals provided by a control unit.

Further, U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, discloses seven exemplary floating point formats including a zero format, an underflow format, a denormalized format, a normalized nonzero format, an overflow format, an infinity format, and a NaN format. Still further, U.S. Pat. No. 6,131,106 ("the '106 patent"), issued Oct. 10, 2000 and entitled "System And Method For Floating Point Computation In Delimited Floating Point Representation," assigned to the assignee of the present application, which is hereby incorporated by reference, discloses a delimited format.

Regarding a logarithm unit, IEEE Std. 754 specifies a logarithm function that essentially generates the contents of the exponent field of a floating point number minus an exponent bias as a result. However, this result may not be mathematically accurate for all formats. It is desirable to provide a logarithm unit that generates a mathematically accurate integer part of a logarithm of an absolute value of an operand for all formats including formats provided by IEEE Std. 754, U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, and U.S. Pat. No. 6,131,106. Further it is desirable to provide a logarithm unit that encodes floating point status information in the results generated by the logarithm unit. Still further, if status information is encoded in the operand, it is desirable to provide a logarithm unit that preserves the status information in the result.

SUMMARY OF THE INVENTION

There is provided a method for generating an integer part of a logarithm of a floating point operand. The method comprises analyzing a format of the floating point operand and generating at least one signal representative of the format. The method further comprises determining a magnitude of an unbiased exponent of the floating point operand as an intermediate result based on the at least one signal, wherein the unbiased exponent is represented by unbiased exponent bits. Still further, the method comprises determining an exponent field and a fraction field high part of the intermediate result. A result is assembled equaling the integer part of the logarithm of the floating point operand based on the at least one signal wherein, if the floating point operand is in at least one of a denormalized format, a normalized non-zero format, and a delimited format, an exponent field of the result equals the exponent field of the intermediate result and a fraction field high part of the result equals the fraction field high part of the intermediate result.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 7 illustrates exemplary formats for representing a floating point operand according to an embodiment of the present invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1:
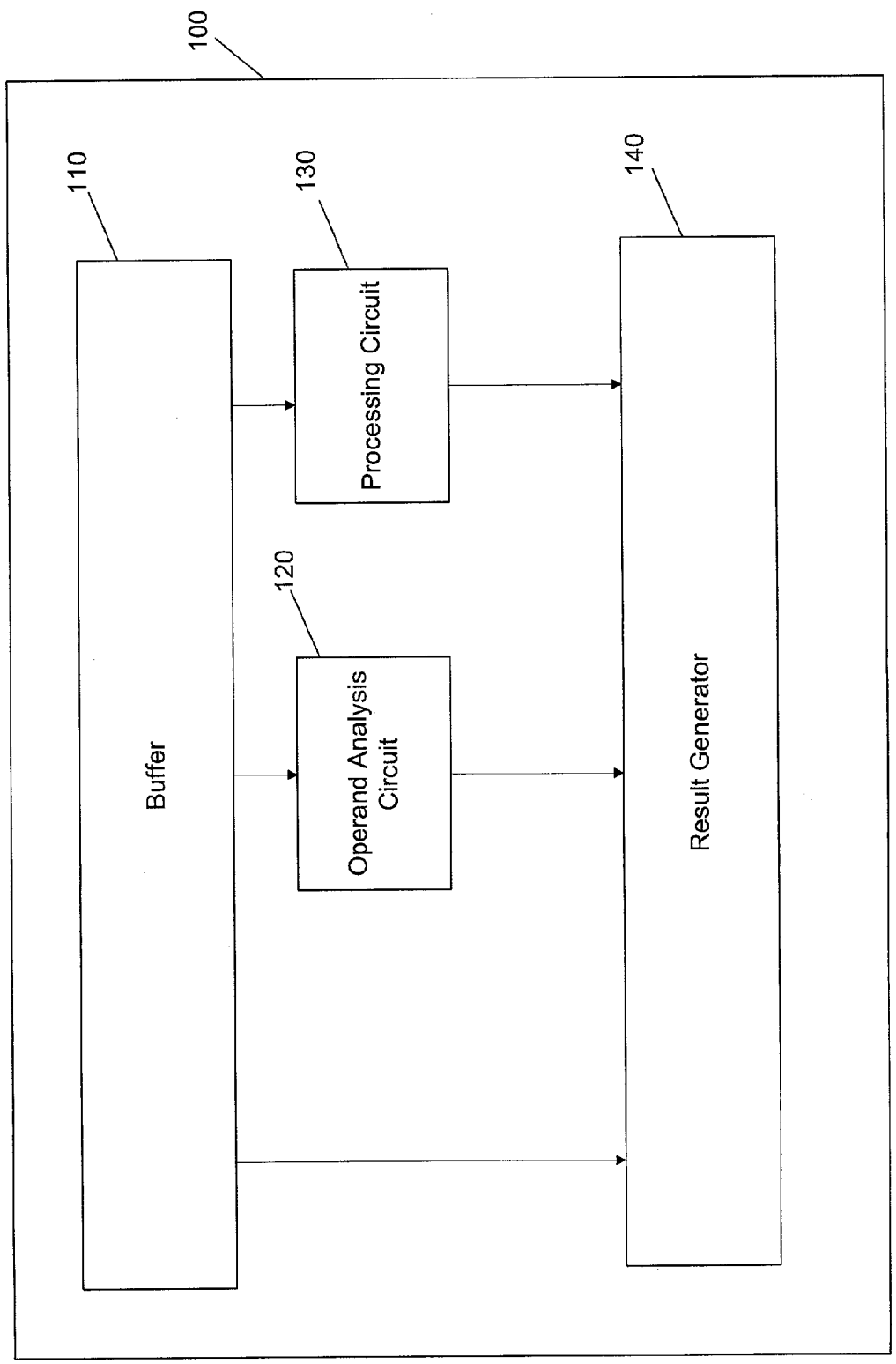
FIG. 1 illustrates a functional block diagram of an exemplary floating point logarithm unit for computing an integer part of a logarithm of a floating point operand according to an embodiment of the present invention.
Figure 2:
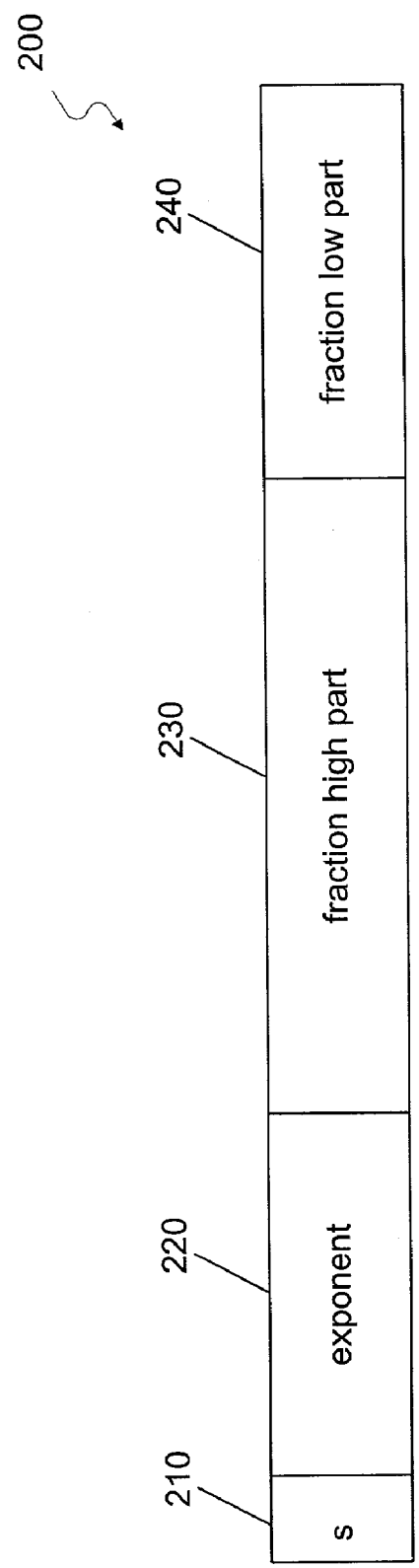
FIG. 2 illustrates an exemplary floating point operand showing a fraction high part and a fraction low part according to an embodiment of the present invention.

FIG. 1 illustrates an exemplary logarithm integer part unit 100 that may be used to compute an integer part of a logarithm of a floating point operand according to an embodiment of the present invention. The logarithm unit 100, which may be one of a group of functional units, computes the integer part of the logarithm of a floating point operand based on the format of the floating point operand. An operand used by the logarithm unit 100 may include floating point status information embedded within the operand itself. Further, the logarithm unit 100 may encode floating point status information in the result generated by the logarithm unit 100. The illustrated embodiment of the logarithm unit 100 includes an operand analysis circuit 120, a processing circuit 130, and a result generator 140. The logarithm unit 100 generally operates as follows. The operand buffer 110 receives and stores a 32-bit floating point operand. As shown in FIG. 2, the floating point operand 200 may include a sign bit 210, an exponent field 220 having eight exponent field bits, $e_{msb} \ldots e_{lsb}$, and a fraction field having a high part 230 and a low part 240 that together includes twenty-three fraction field bits, $f_{msb} \ldots f_{lsb}$. To preserve status information that may be stored in the operand 200, the logarithm unit 100 may divide the fraction field into two parts, the high part 230 and the low part 240. In one embodiment, the fraction field low part 240 may contain all the fraction field bits that store status information while the fraction field high part 230 may contain all other bits of the fraction field. In the illustrated embodiment, the fraction field high part 230 includes the eighteen most significant bits, $f_{msb} \ldots f_{lsb+5}$, of the operand fraction field. The fraction field low part 240, which contains the status information, includes the remaining five least significant bits, $f_{lsb+4} \ldots f_{lsb}$, of the operand fraction field. In alternate embodiments, the bits of the operand 200 may be distributed among the various fields in a variety of different combinations. For example, the exponent field 220 may consist of eight bits, the fraction field high part 230 may consist of the twenty most significant bits, $f_{msb} \ldots f_{lsb+3}$, of the operand, and the fraction field low part 240 may consist of the remaining three least significant bits, $f_{lsb+2} \ldots f_{lsb}$, of the operand fraction field. Still further, the status information may be stored in disjointed bits of the fraction field and therefore the fraction field high part 230 and the fraction field low part 240 may not be continuous segments of the fraction field as illustrated in FIG. 2.

The exemplary operand analysis circuit 120 analyzes the floating point operand 200 received from the operand buffer 110 and generates signals that indicate the operand's format. As discussed above, the logarithm unit 100 computes the integer part of the floating point operand 200 based on the format of the operand 200. Accordingly, the signals from the operand analysis circuit 120 are provided to the result generator 140 to assemble a resulting floating point number based on the format of the floating point operand 200. The signals from the operand analysis circuit 120 are also provided to the processing circuit 130, which computes the integer part of the logarithm of the operand 200 based on the format of the operand 200.

The exemplary processing circuit 130 receives the fraction field bits of the operand 200 from the operand buffer 110 and the signals from the operand analysis circuit 120. The processing circuit 130 determines the magnitude of the unbiased exponent of the operand 200 in operand buffer 110 as an intermediate result and generates signals representing an exponent field and a plurality of fraction field high part bits of the intermediate result in a floating point format. The exponent field may be in a biased form. The signals from the processing circuit 130 are provided to the result generator 140.

The exemplary result generator 140 receives the floating point operand 200 from the operand buffer 110, the signals from the operand analysis circuit 120, and the signals from the processing circuit 130 to assemble a resulting floating point number equivalent to the integer part of the logarithm of the floating point operand 200 stored in operand buffer 110. The resulting floating point number may then be coupled onto a result bus (not shown) and used for further processing.

More specifically, if the operand 200 is in a NaN format according to related U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, then the result generator 140 may generate a result in the NaN format having the same sign and status information as the operand 200. If the operand 200 is in a NaN format according to IEEE Std. 754, then the result generator 140 may generate a result in the NaN format having the same sign as the operand 200 and may generate at least one signal indicating status information (e.g., divide-by-zero).

Generally, if the operand 200 is in an infinity format, regardless of the sign of the operand 200, then the result generator 140 may generate a result in the positive infinity format.

If the operand 200 is in an infinity format according to related U.S. patent application Ser. No. 10/035,747, then the result generator 140 may generate a result additionally having the same status information as the operand 200.

If the operand 200 is in an overflow format, regardless of the sign of the operand 200, then the result generator 140 may generate a result in the positive overflow format.

If the operand 200 is in an underflow format, regardless of the sign of the operand 200, then the result generator 140 may generate a result in a negative overflow format.

If the operand 200 is in a zero format, regardless of the sign of the operand 200, then the result generator 140 may generate a result in the negative infinity format.

For any other operand 200 (e.g., an operand in the normalized nonzero format, denormalized format, or delimited format), the result is the integer part of the logarithm (e.g., base-2) of the operand 200. Further, the sign of the result is positive unless the operand 200 is less than one. Still further, the result is an integer represented in a floating point format.

Figure 3:
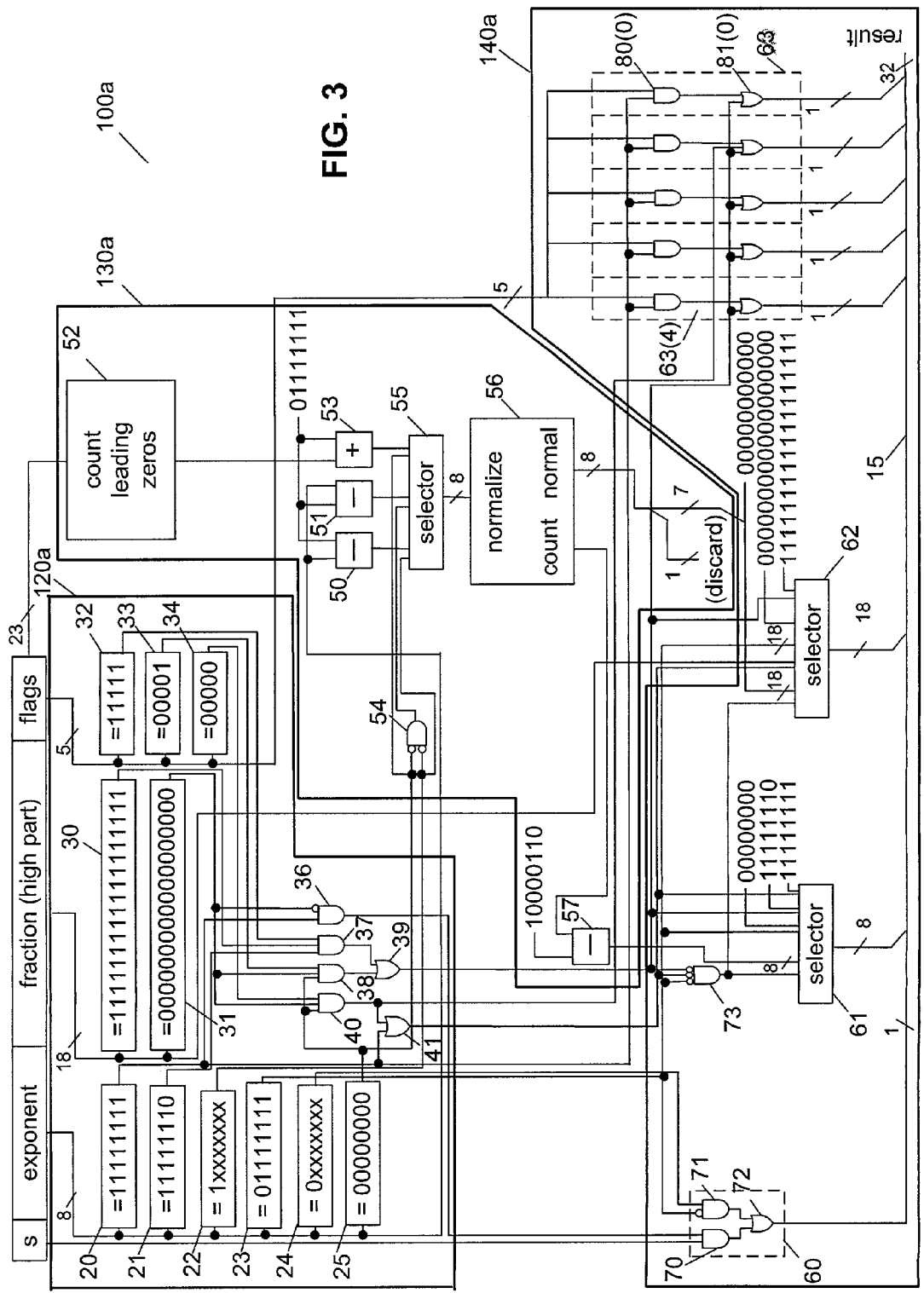
FIG. 3 illustrates an exemplary floating point logarithm unit according to a first embodiment of the present invention.

FIG. 3 illustrates an exemplary embodiment of a logarithm unit 100a that may be used when the floating point operand 200 stored in the operand buffer 110 may be in a format according to related U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application.

FIG. 7 illustrates the zero format 710, the underflow format 720, the denormalized format 730, the normalized nonzero format 740, the overflow format 750, the infinity format 760, and the NaN format 770, as disclosed in related U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application. As shown in FIG. 7, in the zero format 710, the exponent field bits, $e_{msb}, \ldots e_{lsb}$, and the fraction field bits, $f_{msb} \ldots f_{lsb}$, are all binary zeros. In the underflow format 720, the exponent field bits, $e_{msb} \ldots e_{lsb}$, are all binary zeros, the twenty-two most significant fraction field bits, $f_{msb} \ldots f_{lsb+1}$, are all binary zeros, and the least significant fraction field bit, $f_{lsb}$, is a binary one.

In the denormalized format 730, the exponent field bits, $e_{msb} \ldots e_{lsb}$, are all binary zeros and the fraction field bits, $f_{msb} \ldots f_{lsb}$, are not all binary zeros. In the normalized nonzero format 740, the exponent field bits, $e_{msb} \ldots e_{lsb}$, are neither all binary ones nor all binary zeros. In the overflow format 750, the seven most significant exponent field bits, $e_{msb} \ldots e_{lsb+1}$, are all binary ones, with the least significant bit, $e_{lsb}$, being a binary zero, and the fraction field bits, $f_{msb} \ldots f_{lsb}$, are all binary ones. In the infinity format 760, the exponent field bits, $e_{msb} \ldots e_{lsb}$, are all binary ones, the eighteen most significant fraction field bits, $f_{msb} \ldots f_{lsb+5}$ are all binary zeros, and the five least significant fraction field bits, $f_{lsb+4} \ldots f_{lsb}$, are flags. In the NaN format 770, the exponent field bits, $e_{msb} \ldots e_{lsb}$, are all binary ones, the eighteen most significant fraction field bits, $f_{msb} \ldots f_{lsb+5}$, are not all binary zeros, and the five least significant fraction field bits, $f_{lsb+4} \ldots f_{lsb}$, are flags.

For the infinity format 760 and the NaN format 770, the five flags of the five least significant fraction field bits, $f_{lsb+4} \ldots f_{lsb}$, may include the IEEE Std. 754 flags. These flags include an invalid operation flag, n, an overflow flag, o, an underflow flag, u, a division-by-zero flag, z, and an inexact flag, x. For example, a number in the NaN format 760 with the overflow flag, o, and the division-by-zero flag, z, set, indicates that the number resulted from a computation in which an overflow occurred and a divide by zero was attempted. The flags provide the same status information as would be provided by a floating point status register in a prior art floating point unit.

In addition, a value in any of the other formats 710–750 may be indicated as being inexact based on at least one bit of the fraction field, for example, the least-significant bit.

Returning to FIG. 3, the structure and operation of the exemplary logarithm unit 100a will be described. Similar to the general circuitry described with respect to FIG. 1, the exemplary logarithm unit 100a in the illustrated embodiment of FIG. 3 includes an operand analysis circuit 120a, a processing circuit 130a, and a result generator 140a.

The operand analysis circuit 120a may determine the operand's format using the comparators 20–25, 30–34 and logic elements 36–41. The comparator 20 generates an asserted signal if the exponent field bits, $e_{msb} \ldots e_{lsb}$, of the operand 200 are all binary ones, which will be the case if the operand 200 is in the infinity format 760 or the NaN format 770. If the operand 200 is in the overflow format 750, the comparator 21 generates an asserted signal. The comparator 22 generates an asserted signal if the most significant exponent field bit, $e_{msb}$, of the operand 200 is a binary one and each of the other exponent field bits, $e_{msb+1} \ldots e_{lsb}$, is either a binary one or binary zero, which will be the case if the operand 200 is in the overflow format 750, infinity format 760, or NaN format 770, and which may be the case if the operand 200 is in the normalized non-zero format 740. If the operand 200 is the normalized non-zero format 740, an asserted signal by comparator 22 indicates that the operand's exponent, in unbiased form, is positive. If the operand 200 is in the normalized non-zero format 740, comparator 23 may generate an asserted signal, further indicating that the operand's exponent, in unbiased form, is zero. The comparator 24 generates an asserted signal if the most significant exponent field bit, $e_{msb}$, of the operand 200 is a binary zero and each of the other exponent field bits, $e_{msb+1} \ldots e_{lsb}$, is either a binary one or binary zero, which may be the case if the operand 200 is in the normalized non-zero format 740. If the operand 200 is the normalized non-zero format 740, an asserted signal by comparator 24 indicates that the operand's exponent, in unbiased form, is either zero or negative. If the operand 200 is in the zero format 710, underflow format 720, or denormalized format 730 the comparator 25 generates an asserted signal.

Still further, the comparator 30 generates an asserted signal if the fraction field high part bits, $f_{msb} \ldots f_{lsb+5}$, of the operand 200 are all binary ones, which may be the case if the operand 200 is in the denormalized format 730, normalized non-zero format 740, overflow format 750, or NaN format 770. The comparator 31 generates an asserted signal if the fraction field high part bits, $f_{msb} \ldots f_{lsb+5}$, of the operand 200 are all binary zeros, which will be the case if the operand 200 is in the zero format 710 or infinity format 760.

Finally, the comparator 32 generates an asserted signal if the fraction field low part bits, $f_{msb+4} \ldots f_{lsb}$, of the operand 200 are all binary ones, which may be the case if the operand 200 is in the denormalized format 730 or normalized non-zero format 740, and which will be the case if the operand 200 is in the overflow format 750, or if all of the flags "n," "o," "u," "z," and "x" are set in the infinity format 760 or NaN format 770. The comparator 33 generates an asserted signal if the four most significant fraction field low part bits, $f_{msb+4} \ldots f_{lsb+1}$, of the operand 200 are all binary zeros and the least significant fraction field bit, $f_{lsb}$, is a binary one, which will be the case if the operand 200 is in the underflow format 720, and which may be the case if the operand 200 is in the denormalized format 730 or normalized non-zero format 740 or if the flags "n," "o," "u," and "z" are clear and the flag "x" is set in the infinity format 760 or NaN format 770. The comparator 34 generates an asserted signal if the fraction field bits, $f_{lsb+4} \ldots f_{lsb}$, of the operand 200 are all binary zeros, which will be the case if the operand 200 is in the zero format 710, and which may be the case if the operand 200 is in the denormalized format 730 or normalized non-zero format 740 or if the flags "n," "o," "u," "z" and "x" are clear in the infinity format 760 or NaN format 770.

The combinatorial logic elements 36–41 receive selected ones of the signals from the comparators 20–25, 30–34 and generate asserted signals to provide information regarding the format of the operand 200. More specifically, the gate 36 generates an asserted signal, indicating the operand 200 is in the NaN format 770, if the comparator 31 generates a negated signal and the comparator 20 generates an asserted signal. The AND gate 37 generates an asserted signal, indicating the operand 200 is in the overflow format 750, if the comparators 21, 30 and 32 all generate asserted signals. The AND gate 38 generates an asserted signal, indicating the operand 200 is in the underflow format 720, if the comparators 25, 31 and 33 all generate asserted signals. The OR gate 39 generates an asserted signal, indicating the operand 200 is in the overflow format 750 or the underflow format 720, if either AND gate 37 or 38 generates an asserted signal. The AND gate 40 generates an asserted signal, indicating the operand 200 is in the zero format 710, if the comparators 25, 31 and 34 all generate asserted signals. The OR gate 41 generates an asserted signal, indicating the operand 200 is in the zero format 710, infinity format 760, or NaN format 770, if either comparator 20 or AND gate 40 generates an asserted signal.

In the embodiment illustrated in FIG. 3, the processing circuit 130a includes a NAND gate 54, subtraction circuits 50, 51, an adder circuit 53, a count leading zeros circuit 52, a selector circuit 55, a normalization circuit 56, and a subtraction circuit 57. Once the processing circuit 130a receives the signals generated by operand analysis circuit 120a and provided by the operand buffer 110, the processing circuit 130a generates signals that may be used by the result generator 140a to generate a result.

In particular, the processing circuit 130a generates signals representing the absolute value or magnitude of the unbiased exponent of the operand 200 in operand buffer 110. In one embodiment, the processing circuit 130a may generate the signals in two steps. First, the processing circuit 130a generates signals representing the absolute value or magnitude of the unbiased exponent in unsigned integer form. Second, the processing circuit 130a generates, from the unsigned integer, an exponent portion and fraction portion that may be included in a floating point representation for the unbiased exponent, with the exponent portion being in biased form.

In more detail, the processing circuit 130a may operate as follows. The subtraction circuits 50 and 51 receive signals representing the exponent field bits, $e_{msb} \ldots e_{lsb}$, of the operand 200 and signals representing a bit pattern whose binary-encoded value corresponds to a bias value, for example, 01111111.

The subtraction circuit 50 subtracts the bias value from the value of the exponent field bits, $e_{msb} \ldots e_{lsb}$, and generates output signals representing the result. If the value of the unbiased exponent of the operand 200 in operand buffer 110 is greater than or equal to zero, then the signals generated by subtraction circuit 50 represent the binary-encoded unbiased value of the exponent. Accordingly, the signals generated by subtraction circuit 50 are used in generating the result.

The subtraction circuit 51 subtracts the value of the exponent field bits, $e_{msb} \ldots e_{lsb}$, from the bias value and generates output signals representing the result. If the value of the unbiased exponent of the operand 200 is less than or equal to zero, the signals generated by subtraction circuit 51 represent the magnitude of the unbiased exponent of the operand 200. Accordingly, the signals generated by subtraction circuit 51 are used in generating the result.

The count leading zeros circuit 52 receives signals representing the fraction field bits, $f_{msb} \ldots f_{lsb}$, of the operand 200 and generates output signals representing the binary-encoded value of the number "$n_1$", where $n_1$ equals the number of successive bits from the most significant fraction field bit, $f_{msb}$, to the first bit $f_{msb-n}$ that has the value one.

The adder circuit 53 receives signals generated by the count leading zeros circuit 52 and signals representing a bit pattern whose binary-encoded value corresponds to the bias value and generates output signals representing a bit pattern whose binary-encoded value corresponds to their sum. If the operand 200 is in the denormalized format 730, the signals generated by adder circuit 53 will be used in generating the result.

The NAND gate 54 generates an asserted signal, indicating the operand 200 is in the normalized non-zero format 740 for which the unbiased exponent is less than or equal to zero, if both comparators 22 and 25 generate negated signals.

The selector circuit 55 selectively couples one of signals received from subtraction circuit 50, subtraction circuit 51, and adder circuit 53 as signals representing the magnitude of the unbiased exponent bits, $u_{msb} \ldots u_{lsb}$, of the operand 200. The selector circuit 55 selects signals received from subtraction circuit 50 if the comparator 22 generates an asserted signal indicating the unbiased exponent of the operand 200 is greater than zero. The selector circuit 55 selects signals received from the subtraction circuit 51, if the NAND gate 54 generates an asserted signal indicating that the unbiased exponent of the operand 200 is less than or equal to zero. The selector circuit 55 selects signals received from the adder circuit 53 if the comparator 25 generates an asserted signal indicating that the operand 200 is in the zero format 710, underflow format 720, or denormalized format 730. If the operand 200 is in the denormalized format 730, the result of the adder circuit 53 represents the magnitude of the unbiased exponent bits, $u_{msb} \ldots u_{lsb}$, of the operand 200 based on the fact that if the most significant bit of the fraction field is a one, then the correct magnitude for the integer part of the logarithm may equal a bias value, e.g., 01111111. This follows from IEEE Std. 754. Each additional leading zero in the fraction field represents an additional reduction in the magnitude of the fraction by a factor of two, and therefore a decrease of the integer part of the logarithm by one. Because the logarithm of such a small value is negative, decreasing the logarithm by one corresponds to increasing the magnitude of the logarithm by one. Therefore the bias value, e.g., 01111111, is increased by the number of leading zeros in the fraction field to produce the magnitude for the integer part of the logarithm.

The signals representing the unbiased exponent bits, $u_{msb} \ldots u_{lsb}$, provided by the selector 55 represent the integer of the logarithm (base 2) of the operand 200. To convert the integer to a floating point format (i.e., to determine an exponent field and a fraction field for the integer in floating point format), the signals from the selector 55 are provided to the normalization circuit 56.

The normalization circuit 56 receives the signals representing the unbiased exponent bits, $u_{msb} \ldots u_{lsb}$, from the selector 55 and generates two sets of output signals, i.e., count signals and normalized unbiased exponent signals. The count signals represent the binary-encoded value of the number "$n_2$", where $n_2$ equals the number of bits from the most significant unbiased exponent bit, $u_{msb}$, to the first bit $u_{msb-n}$ that equals a binary one.

The subtraction circuit 57 receives the count signals from the normalization circuit 56 and signals representing a bias value plus the number of bits input to the normalization circuit 56 minus one. In one embodiment, the bit pattern may equal 10000110, which corresponds to the IEEE Std. 754 bias value plus eight (i.e., the number of bits input to the normalization circuit 56) minus one. The subtraction circuit 57 generates signals representing a biased exponent value of the integer part of the logarithm of the operand 200 in floating point format, which is the difference between the signals representing the bit pattern and the count signals. In one embodiment, the result for the subtraction circuit 57 represents the biased exponent value of the integer part of the logarithm of the operand 200 in floating point format based on the fact that if the most significant bit input to the normalization circuit 56 is a one, then the integer part of the logarithm of the value input to the normalization circuit 56 is seven (one less than the number of bits input to the normalization circuit 56). In this case, the normalization circuit 56 outputs a count of zero, which when subtracted from the bit pattern input to the subtraction circuit 57 yields the bit pattern input to the subtraction circuit 57. When the bit pattern equals 10000110 (i.e., 127+8−1), the biased exponent value equals seven (i.e., the integer part of the logarithm of the value input to the normalization circuit 56) plus a bias represented by the bit pattern 01111111. As discussed above regarding adder circuit 53, for every additional leading zero in the input to the normalization circuit 56, the integer part of its logarithm should be decreased by one because, for each leading zero, the count output of the normalization circuit 56 is increased by one. The total count value is subtracted from the bit pattern 10000110 (i.e., 127+7), thus producing a correctly biased exponent value.

The normalized unbiased exponent signals provided by the normalization circuit 56 represent normalized unbiased exponent bits, $u^n_{msb} \ldots u^n_{lsb}$, in which the normalized unbiased exponent bit $u^n_b$ corresponds to the unbiased exponent bit, $u_{b-n}$. Further, the low-order normalized unbiased exponent bits, $u^n_{lsb+n-1} \ldots u^n_{lsb}$, all equal a binary zero. The most significant bit, $u^n_{msb}$, of the normalized unbiased exponent bits from the normalization circuit 56 may equal a binary one and may be implicit in the result (in the same manner as the normalized format as defined by IEEE Std. 754, as described above). Accordingly, the most significant bit, $u^n_{msb}$, may be discarded. The resulting normalized unbiased exponent bits may be used by the result generator 140 to represent the seven most significant fraction field high part bits of the integer part of the logarithm of the operand 200 in floating point format.

In the illustrated embodiment of FIG. 3, the result generator 140a includes a sign generator 60, selectors 61, 62, and a combiner circuit 63. The result generator 140a assembles a result that is coupled onto a result bus 15. Generally, the sign generator 60 generates a signal representative of the sign of the result, the selectors 61 and 62 selectively generates signals representative of the exponent field bits, $e_{msb}^r \ldots e_{lsb}^r$, of the result and the fraction field high part bits, $f_{msb}^r \ldots f_{lsb+5}^r$, of the result, respectively, and the combiner circuit 63 generates signals representative of the fraction field low part bits, $f_{lsb+4}^r \ldots f_{lsb}^r$, of the result.

The sign generator 60 may include an AND gate 70, NAND gate 71, and OR gate 72. The OR gate 72 couples an asserted signal onto result bus 15, indicating a negative result, if the signal generated by either the AND gate 70 or the NAND gate 71 is asserted. The AND gate 70 generates an asserted signal, indicating that the operand 200 in operand buffer 110 is a negative value in the NaN format 770, if the sign bit in the operand buffer 110 and the signal generated by NAND gate 36 are both asserted. The NAND gate 71 generates an asserted signal, indicating that the magnitude of the operand 200 is less than one, if the comparator 23 generates a negated signal and the comparator 24 generates an asserted signal. Therefore, the sign generator 60 generates an asserted signal indicating the result is negative if the operand 200 is a negative value in the NaN format 770 or if the operand magnitude of the operand 200 is less than one, which will be the case if the operand 200 is in the zero format, the underflow format 720, the denormalized format 730, or a value in the normalized non-zero format 740 whose unbiased exponent is less than zero. Otherwise, if the operand 200 is in the normalized non-zero format 740 with the unbiased exponent greater than or equal to zero or if the operand 200 is in the overflow format 750, infinity format 760, or a positive value in the NaN format 770, the sign generator 60 generates a negated signal to indicate a positive sign bit.

Each selector 61 and 62 receives, respectively, signals from the subtraction circuit 57 and the normalization circuit 56. The selectors 61, 62 further receive signals representative of predetermined bit patterns. The selectors 61, 62 are controlled by signals from the operand analysis circuit 120 and selectively couple one set of signals to the result bus 15. If the comparator 23, the OR gate 39, and the OR gate 41 all generate negated signals, a gate 73 generates an asserted signal to enable the selector 61 to couple the signals from the subtraction circuit 57, as signals representing the exponent field bits, $e_{msb}^r \ldots e_{lsb}^r$, of the result. The gate 73 generates an asserted signal if the operand 200 is in the denormalized format 730 or the normalized non-zero format 740. Furthermore, if the gate 73 generates an asserted signal, selector 62 couples signals representing the normalized bits, $u^n{}_{msb-1} \ldots u_{lsb}^r$, from the normalization circuit 56 to the result bus 15 as the fraction field bits $f_{msb}^r \ldots f_{msb-6}^r$ of the result. Still further, the selector 62 couples signals representing the value zero to the result bus 15 for the fraction field bits $f_{msb-7} \ldots f_{lsb}$ of the result.

If the comparator 23 generates an asserted signal, indicating that the unbiased exponent of the operand 200 has the value zero, the selectors 61 and 62 may couple signals representing a bit pattern of all zeros to the result bus 15 for the exponent field bits, $e_{msb}^r \ldots e_{lsb}^r$, and the fraction field high part bits, $f_{msb}^r \ldots f_{lsb+5}^r$, of the result, respectively. As will be described below, the combiner 63 also provides signals representing the value zero for the fraction field low part bits, $f_{lsb+4}^r \ldots f_{lsb}^r$, of the result.

If the OR gate 39 generates an asserted signal, indicating that the operand 200 is in the underflow format 720 or the overflow format 750, selector 61 couples signals representative of the bit pattern 11111110 to the result bus 15 for the exponent field bits, $e_{msb}^r \ldots e_{lsb}^r$, of the result, which corresponds to the bit pattern for the overflow format 750. In addition, selector 62 couples signals representative of the bit pattern 1111111111111111111 to the result bus 15 for the fraction field high part bits, $f_{msb}^r \ldots f_{lsb+5}^r$, of the result, which corresponds to the bit pattern for the overflow format 750. As will be described below, if the OR gate 39 generates an asserted signal, the combiner circuit 63 will also generate signals representative of the bit pattern 11111 for the fraction field low part bits, $f_{lsb+4}^r \ldots f_{lsb}^r$, of the result, which corresponds to the bit pattern for the overflow format 750.

Finally, if the OR gate 41 generates an asserted signal, indicating that the operand 200 is in the zero format 710, infinity format 760 or the NaN format 770, selector 61 couples signals representative of the bit pattern 11111111 to the result bus 15 for the exponent field bits, $e_{msb}^r \ldots e_{lsb}^r$, of the result, which corresponds to the bit pattern for the infinity format 760 and the NaN format 770. In addition, selector 62 couples signals representative of the fraction field high part bits, $f_{msb} \ldots f_{lsb+5}$, of the operand 200 to the result bus 15 for the fraction field high part bits, $f_{msb}^r \ldots f_{lsb+5}^r$, of the result. Accordingly, the fraction field high part bits, $f_{msb}^r \ldots f_{lsb+5}^r$, of the result will correspond to the corresponding bits of the operand 200.

More specifically, when the operand 200 is in the zero format 710, having fraction field high part bits, $f_{msb} \ldots f_{lsb+5}$, of the operand 200 equal to the bit pattern 00000000000000000, the selector 62 couples signals representative of the bit pattern to the result bus 15 for the fraction field high part bits, $f_{msb}^r \ldots f_{lrb+5}^r$, of the result. The selector 61 further couples signals representative of the bit pattern 11111111, corresponding to the infinity format 760, to the result bus 15 for the exponent field bits, $e_{msb}^r \ldots e_{lsb}^r$, of the result. Still further, the sign generator 60 provides an asserted signal to the result bus 15, causing a negative result. Finally, as will be described below, the combiner circuit 63 provides an asserted signal to the result bus 15 for bit $f_{lsb+5}$ to provide an asserted divide-by-zero flag "z".

When the operand 200 is in the infinity format 760, having fraction field high part bits, $f_{msb} \ldots f_{lsb+5}$, of the operand 200 equal to the bit pattern 00000000000000000, the selector 62 couples signals representative of the bit pattern to the result bus 15 for the fraction field high part bits, $f_{msb}^r \ldots f_{lsb+5}^r$, of the result. Further, the selector 61 couples signals representative of the bit pattern 11111111, corresponding to the infinity format 760, to the result bus 15 for the exponent field bits, $e_{msb}^r \ldots e_{lsb}^r$, of the result. Still further, the sign generator 60 provides a negated signal to the result bus 15, causing a positive result. Finally, as will be described below, the combiner circuit 63 couples signals representative of the fraction field low part bits, $f_{lsb+4} \ldots f_{lsb}$, of the operand 200 to the result bus 15 for the fraction field low part bits, $f_{lsb+4}^r \ldots f_{lsb}^r$, of the result, thereby propagating the floating point status information from the operand 200 to the result.

Finally, when the operand 200 is in the NaN format 770, having fraction field high part bits, $f_{msb} \ldots f_{lsb+5}$, of the operand 200 not all equal zero, the selector 62 couples signals representative of the fraction field high part bits, $f_{msb} \ldots f_{lsb+5}$, of the operand 200 to the result bus 15 for the fraction field high part bits, $f_{msb}^r \ldots f_{lsb+5}^r$, of the result. The selector 61 further couples signals representative of the bit pattern 11111111, corresponding to the NaN format 770, to the result bus 15 for the exponent field bits, $e_{msb}^r \ldots e_{lsb}^r$, of the result. Still further, the sign generator 60 provides a signal corresponding to the sign bit of the operand 200 to the result bus 15 for the sign of the result. Thus, the sign of the result corresponds to the sign of the operand 200. Finally, as will be described below, the combiner circuit 63 couples signals representative of the fraction field low part bits, $f_{lsb+4} \ldots f_{lsb}$, of the operand 200 to the result bus 15 for the fraction field low part bits, $f_{lsb+4} \ldots f_{lsb}$, of the result, thereby propagating the floating point status information from the operand 200 to the result.

The combiner circuit 63 receives signals representative of the fraction field low part bits, $f_{lsb+4} \ldots f_{lsb}$, of the operand 200 and signals from the operand analysis circuit 120a. The combiner circuit 63 provides signals to the result bus 15 that are representative of the fraction field low part bits, $f_{lsb+4}^r \ldots f_{lsb}^r$, of the result. If the operand 200 is in the infinity format 760 or NaN format 770, the signals generated by combiner circuit 63 may correspond to the floating point status information stored in the operand 200. If the operand 200 is in the underflow format 720 or overflow format 750, the signals generated by the combiner circuit 63 may all equal a binary one. If the result is in the zero format 710, the signals generated by the combiner circuit 63 may all equal a binary zero, except the signal representing the divide-by-zero status flag, which may equal a binary one. If the result is in any other format, the signals generated by the combiner circuit 63 may all equal a binary zero.

The combiner circuit 63 includes a plurality of combiner segments 63(n) (where n=0, 1, 2, 3, 4), each of which receives a signal representative of the fraction field bit $f_{lsb+n}$ of the operand 200 and generates a signal representative of the fraction field bit $f_{lsb+n}^r$ of the result.

Each combiner segment 63(n) includes an AND gate 80(n) and an OR gate 81(n). Each AND gate 80(n) generates an asserted signal if both the bit $f_{lsb+n}$ of the operand 200 and the signal generated by comparator 20 are asserted. Each OR gate 81(n) receives the signals generated by AND gate 80(n) and OR gate 39. OR gate 81(1) also receives the signal generated by AND gate 40. If any of the signals received by OR gate 81(n) is asserted, the OR gate 81(n) couples an asserted signal to the result bus 15, which is representative of the bit $f_{lsb+n}^r$ of the result.

The comparator 20 generates an asserted signal if the operand 200 is either in the infinity format 760 or the NaN format 770, and otherwise generates a negated signal. Therefore, if the operand 200 is in the infinity format 760 or the NaN format 770, AND gates 80(n) effectively operate to propagate the floating point status flags of the operand 200 to the result bus 15 for the floating point status flags of the result. Otherwise, AND gates 80(n) block signals representative of fraction field low part bits, $f_{lsb+4} \ldots f_{lsb}$, of the operand 200.

The OR gate 39 generates an asserted signal if the operand 200 is in either the underflow format 720 or the overflow format 750. In that case, the OR gates 81(n) provide asserted signals to the result bus 15 for fraction field low part bits, $f_{lsb+4}^r \ldots f_{lsb}^r$, of the result corresponding to the overflow format 750. The AND gate 40 generates an asserted signal if the operand 200 in operand buffer 110 is in the zero format 710. In that case, the OR gate 81(1) couples an asserted signal to the result bus 15 for the bit $f_{lsb+1}^r$ of the result to set the divide-by-zero flag, z, of the result.

U.S. Pat. No. 6,131,106 ("the '106 patent"), issued Oct. 10, 2000 in the name of Guy L. Steele Jr. and entitled "System And Method For Floating Point Computation In Delimited Floating Point Representation," assigned to the assignee of the present application is incorporated herein by reference. In general, the '106 patent describes a system for performing floating point computations on operands in a delimited format in the place of operands in an IEEE Std. 754 denormalized format. For an operand in the delimited format, all the exponent field bits equal a binary zero. The bits in the fraction field correspond to the bits in the fraction field of the denormalized format shifted to the left by n bits, where n equals the number of leading zeros in the fraction field of the denormalized format plus one. Thus, the delimited format provides an implicit most significant digit with the value one in the fraction field.

In an embodiment of the present invention, a delimiter flag is provided in the fraction field of the operand in the delimited format at a bit position to the right of the bit which corresponds to the least significant fraction field bit of the operand in the denormalized format, The delimiter flag indicates the series of fraction field bits of the delimited format that correspond to the series of bits immediately to the right of the most significant fraction field bit of the denormalized format. In that case, the number, n, of successive fraction field bits, $f_{msb} \ldots f_{lsb}$, from the most significant bit, $f_{msb}$, to the first bit $f_{msb-n}$ that has the value one in the denormalized format will correspond to the number, n, of bits $f_{lsb+n} \ldots f_{lsb}$ of the delimited representation following the delimiter flag, which corresponds to the least significant bit that has the value one.

Figure 4:
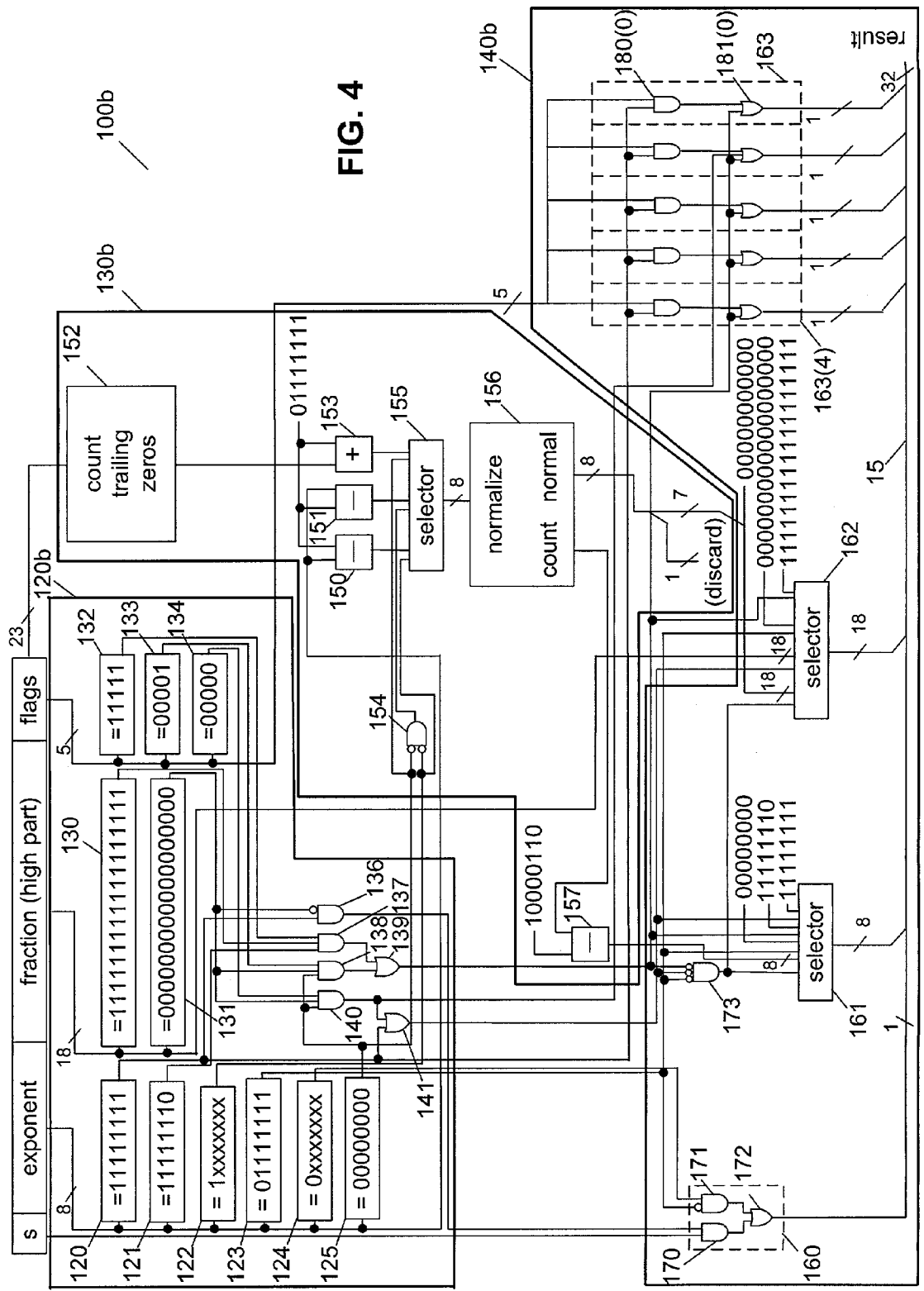
FIG. 4 illustrates an exemplary floating point logarithm unit according to a second embodiment of the present invention.

FIG. 4 illustrates an exemplary embodiment of an logarithm unit 100b that may be used when the floating point operand 200 stored in the operand buffer 110 may be in a format according to U.S. patent application Ser. No. 10/035, 747, filed on even date herewith in the name of Guy L. Steele Jr. and entitled "Floating Point System That Represents Status Flag Information Within A Floating Point Operand," assigned to the assignee of the present application, but instead of the described denormalized format, the operand 200 may be in a delimited format according to U.S. Pat. No. 6,131,106. Referring now to FIG. 4, the logarithm unit 100b is similar to the logarithm unit 100a described above, except that it includes a count trailing zeros circuit 152 instead of a count leading zeros circuit 52 to provide the value n.

More specifically, the count trailing zeros circuit 152 receives signals representing the fraction field bits, $f_{msb} \ldots f_{lsb}$, of the operand 200 and generates output signals representing the binary-encoded value of the number "$n_3$", where $n_3$ equals the number of bits equal to zero to the right of the delimiter flag. Otherwise, the logarithm unit 100b operates in a manner corresponding to that described above in connection with the logarithm unit 100a.

Figure 5:
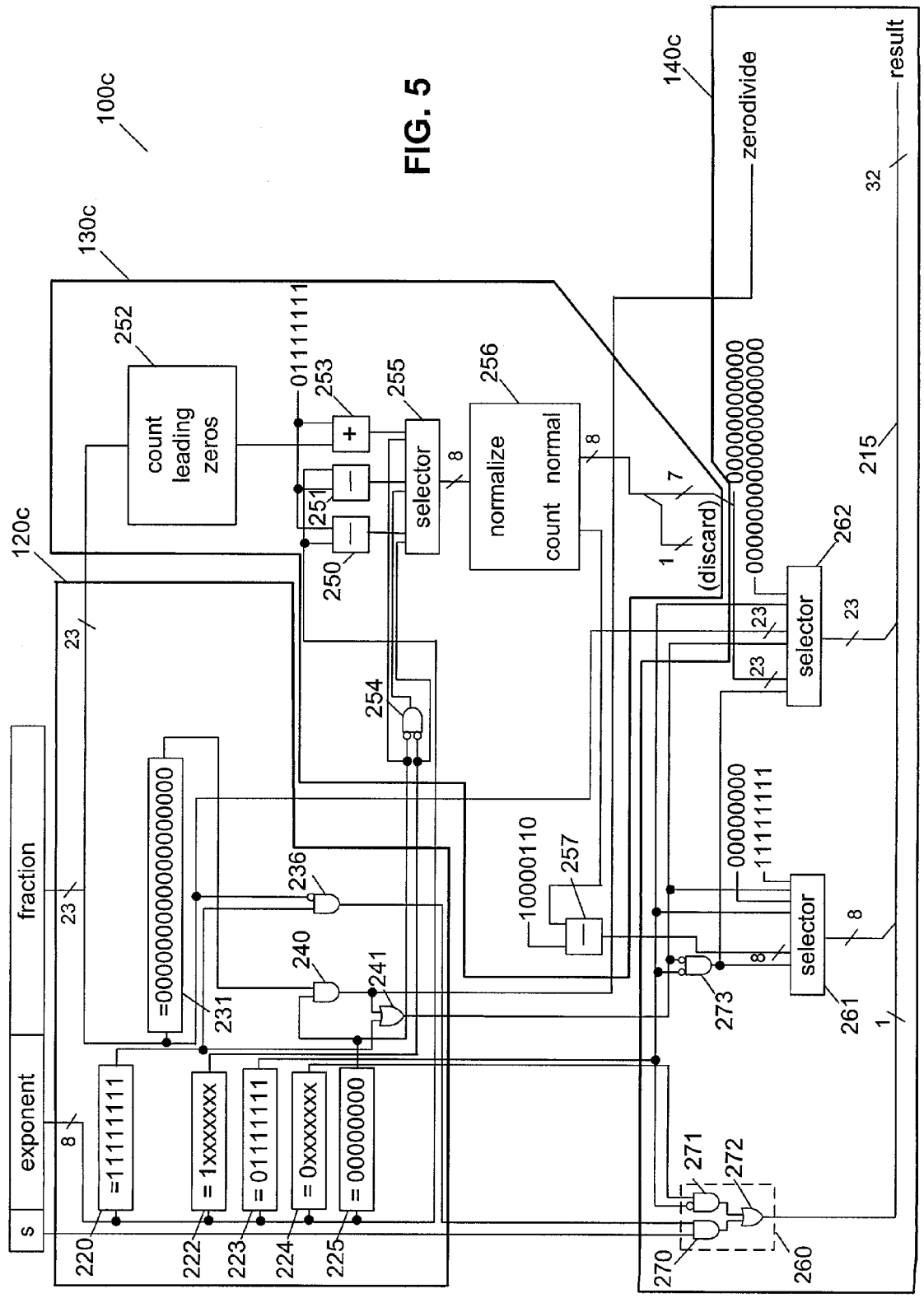
FIG. 5 illustrates an exemplary floating point logarithm unit according to a third embodiment of the present invention.
Figure 6:
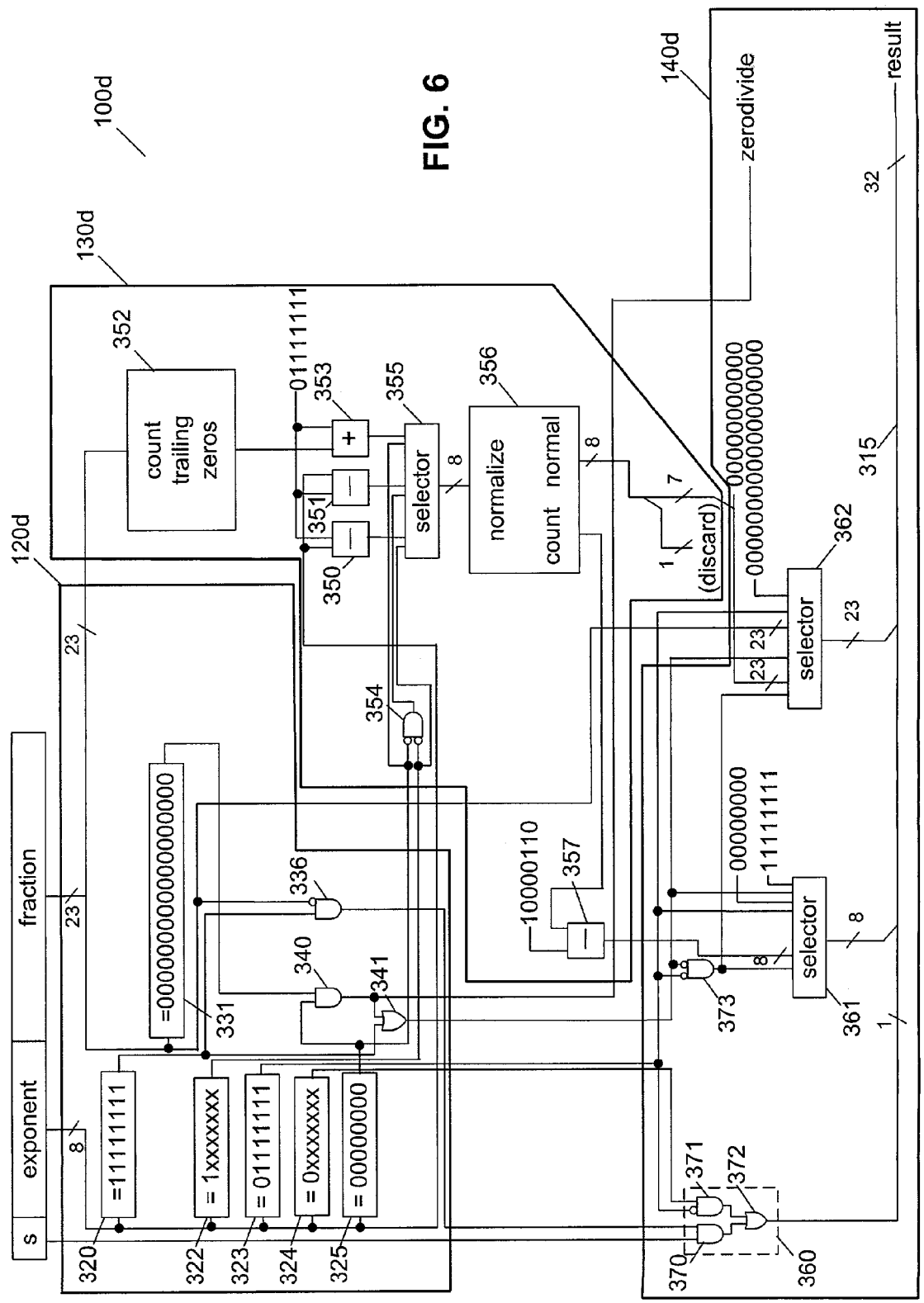
FIG. 6 an exemplary floating point logarithm unit according to a fourth embodiment of the present invention.

FIG. 5 illustrates an exemplary embodiment of a logarithm unit 100c that may be used when the floating point operand 200 stored in the operand buffer 110 may be in a format according to the IEEE Std. 754 format. Likewise, FIG. 6 illustrates an exemplary embodiment of a logarithm unit 100d that may be used when the floating point operand 200 stored in the operand buffer 110 may be in a format according to the IEEE Std. 754 format. However, instead of the denormalized format, the operand in the operand buffer 110 of FIG. 6 may be in a delimited format according to U.S. Pat. No. 6,131,106.

In more detail, the logarithm units 100c of FIGS. 5 and 100d of FIG. 6, are generally similar to logarithm units 100a and 100b, respectively, except that comparators 21, 30, and 32–34 and logic elements 37–39 have been removed in the operand analysis circuits 120c and 120d because there is no underflow 720 and overflow 750 format in IEEE Std. 754 and no status flag information is stored in the operand in IEEE Std. 754. In addition, the result generators 140c and 140d do not include combiner circuits, corresponding to combiner circuit 63, since the floating point status information in IEEE Std. 754 is maintained separate and apart from the floating point operands. Instead, the signals generated by AND gates 240, 340, which indicate whether the operand 200 has the value zero, are coupled to status registers to provide the divide-by-zero flag, z. As with logarithm unit 100b, the logarithm unit 100d, which receives operands in the delimited format, includes a count trailing zeros circuit 352.

The above description of the logarithm units 100a–d assumes a 32-bit floating point operand 200. However, the logarithm units 100a–d may be adapted to receive a floating point operand having any number of bits. For example, the logarithm units 100a–d may be adapted to receive a 64-bit floating-point operand with 52 fraction field bits. Adapting the logarithm units 100*a–d* to receive a floating point operand having any number of bits is known to those of ordinary skill in the art.

Further, the above description of the logarithm unit 100 has been in reference to operands formatted according to U.S. patent application Ser. No. 10/035,747, U.S. Pat. No. 6,131,106, and IEEE Std. 754. However, the logarithm unit 100 may be adapted to receive a floating point and operand having a different format. Adapting the logarithm unit 100 to receive a floating point operand having a different format will be obvious to those of ordinary skill in the art.

Still further, the above description of the logarithm unit 100 assumed that the floating point operands are represented in a number base of two. However, the logarithm unit 10 may be adapted for floating point operands represented in number bases other than base two, using, for example, decimal digits or hexadecimal (base 16) digits rather than binary bits. Adapting the logarithm unit 100 to receive floating point operands represented in other number bases will be obvious to those of ordinary skill in the art.

Finally, the floating point unit 100 may be implemented in software, firmware, hardware, or any combination thereof. For example, the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements which may be connected directly to the system or which may transfer the information to the system over a network or other mechanism for transferring information in a conventional manner.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for generating an integer part of a logarithm of a floating point operand comprising:
   analyzing, using a floating point unit, a format of the floating point operand and generating at least one signal representative of the format;
   determining a magnitude of an unbiased exponent of the floating point operand as an intermediate result based on the at least one signal, wherein the unbiased exponent is represented by unbiased exponent bits;
   determining an exponent field of the intermediate result;
   determining a fraction field high part of the intermediate result; and
   assembling a result equal to the integer part of the logarithm of the floating point operand based on the at least one signal wherein, if the floating point operand is in at least one of a denormalized format, a normalized non-zero format, and a delimited format, an exponent field of the result equals the exponent field of the intermediate result and a fraction field high part of the result equals the fraction field high part of the intermediate result.

2. The method of claim 1, wherein determining the magnitude of the unbiased exponent of the floating point operand as the intermediate result comprises:
   determining a magnitude of a difference between exponent field bits of the floating point operand and a predetermined bias, if the format is a normalized non-zero format; and
   identifying a number of leading zeros in fraction field bits of the floating point operand and adding the number to the predetermined bias, if the format is a denormalized format.

3. The method of claim 1, wherein determining the magnitude of the unbiased exponent of the floating point operand as the intermediate result comprises:
   identifying a number of trailing zeros in fraction field bits of the floating point operand and adding the number to a predetermined bias, if the format is a delimited format.

4. The method of claim 1, wherein determining the exponent field of the intermediate result comprises:
   identifying a number of leading zeros in the unbiased exponent of the floating point operand and subtracting the number from a predetermined bit pattern to determine the exponent field of the intermediate result.

5. The method of claim 1, wherein determining the fraction field high part of the intermediate result comprises:
   normalizing bits of the unbiased exponent of the floating point operand by determining a number of leading zeros in the unbiased exponent bits, shifting the unbiased exponent bits to the left by the number of leading zeros, and
   discarding a most significant bit from the normalized unbiased exponent bits.

6. The method of claim 1, wherein assembling the result comprises:
   setting a sign bit of the result based on the at least one signal representative of the format of the operand;
   setting exponent field bits of the result based on the at least one signal representative of the format of the floating point operand; and
   setting fraction field bits of the result based on the at least one signal representative of the format of the operand.

7. The method according to claim 6, wherein setting the sign bit comprises:
   setting the sign bit to a first value indicating a negative result if the format is at least one of a negative NaN format, a zero format, an underflow format, and a denormalized format; and
   setting the sign bit to a second value indicating a positive result otherwise.

8. The method according to claim 6, wherein setting the exponent field bits of the result comprises:
   setting the exponent field bits of the result to zero if the format of the floating point operand is a normalized non-zero format and the magnitude of the unbiased exponent of the floating point operand is zero;
   setting the exponent field bits of the result to a first bit pattern if the format of the floating point operand is at least one of an underflow format and a overflow format; and
   setting the exponent field bits of the result to a second bit pattern if the format of the floating point operand is at least one of a zero format, an infinity format, and a NaN format.

9. The method according to claim 8, wherein:
the first bit pattern is representative of an overflow format.

10. The method according to claim 8, wherein:
the second bit pattern is representative of one of an infinity and a NaN format.

11. The method according to claim 6, wherein setting the fraction field bits of the result comprises:
setting the fraction field bits of the result to zero if the format of the floating point operand is a normalized non-zero format and the magnitude of the unbiased exponent of the floating point operand is zero;
setting the fraction field bits of the result to a first bit pattern if the format of the floating point operand is at least one of an underflow format and a overflow format; and
setting the fraction field bits of the result to fraction field bits of the floating point operand if the format of the floating point operand is at least one of an infinity format and a NaN format; and
setting the fraction field bits of the result to zero with the exception that at least one bit of the fraction field bits is set to a first value to indicate a divide-by-zero status, if the format of the floating point operand is a zero format.

12. The method according to claim 11, wherein:
the first bit pattern is representative of an overflow format.

13. The method according to claim 6, wherein setting the fraction field bits of the result comprises:
setting the fraction field bits of the result to zero if the format of the floating point operand is a normalized non-zero format and the magnitude of the unbiased exponent of the floating point operand equals zero;
setting the fraction field bits of the result to the fraction field bits of the floating point operand if the format of the floating point operand is at least one of an infinity format and a NaN format; and
setting the fraction field bits of the result to zero and providing at least one status signal having a first value indicating a divide-by-zero status if the format of the floating point operand is a zero format.

14. The method according to claim 1, further comprising:
embedding status information in the result.

15. The method according to claim 14, wherein embedding the status information in the result comprises:
setting at least one bit in the result to a first value to indicate a divide-by-zero status if the format of the floating point operand is a zero format.

16. The method according to claim 14, wherein embedding the status information in the result comprises:
setting at least one bit of the result that stores the status information equivalent to a corresponding bit in the floating point operand that represents the status information.

17. A computer-readable medium on which is stored a set of instructions for generating an integer part of a logarithm of a floating point operand, which when executed performs steps comprising:
analyzing a format of the floating point operand and generating at least one signal representative of the format;
determining a magnitude of an unbiased exponent of the floating point operand as an intermediate result based on the at least one signal, wherein the unbiased exponent is represented by unbiased exponent bits;
determining an exponent field of the intermediate result;
determining a fraction field high part of the intermediate result; and assembling a result equal to the integer part of the logarithm of the floating point operand based on the at least one signal wherein, if the floating point operand is in at least one of a denormalized format, a normalized non-zero format, and a delimited format, an exponent field of the result equals the exponent field of the intermediate result and a fraction field high part of the result equals the fraction field high part of the intermediate result.

18. The computer-readable medium of claim 17, wherein determining the magnitude of the unbiased exponent of the floating point operand as the intermediate result comprises:
determining a magnitude of a difference between exponent field bits of the floating point operand and a predetermined bias, if the format is a normalized non-zero format; and
identifying a number of leading zeros in fraction field bits of the floating point operand and adding the number to the predetermined bias, if the format is a denormalized format.

19. The computer-readable medium of claim 17, wherein determining the magnitude of the unbiased exponent of the floating point operand as the intermediate result comprises:
identifying a number of trailing zeros in fraction field bits of the floating point operand and adding the number to a predetermined bias, if the format is a delimited format.

20. The computer-readable medium of claim 17, wherein determining the exponent field of the intermediate result comprises:
identifying a number of leading zeros in the unbiased exponent of the floating point operand and subtracting the number from a predetermined bit pattern to determine the exponent field of the intermediate result.

21. The computer-readable medium of claim 17, wherein determining the fraction field high part of the intermediate result comprises:
normalizing bits of the unbiased exponent of the floating point operand by determining a number of leading zeros in the unbiased exponent bits, shifting the unbiased exponent bits to the left by the number of leading zeros, and
discarding a most significant bit from the normalized unbiased exponent bits.

22. The computer-readable medium of claim 17, wherein assembling the result comprises:
setting a sign bit of the result based on the at least one signal representative of the format of the operand;
setting exponent field bits of the result based on the at least one signal representative of the format of the floating point operand; and
setting fraction field bits of the result based on the at least one signal representative of the format of the operand.

23. The computer-readable medium of claim 22, wherein setting the sign bit comprises:
setting the sign bit to a first value indicating a negative result if the format is at least one of a negative NaN format, a zero format, an underflow format, and a denormalized format; and
setting the sign bit to a second value indicating a positive result otherwise.

24. The computer-readable medium of claim 22, wherein setting the exponent field bits of the result comprises:
setting the exponent field bits of the result to zero if the format of the floating point operand is a normalized non-zero format and the magnitude of the unbiased exponent of the floating point operand is zero;

setting the exponent field bits of the result to a first bit pattern if the format of the floating point operand is at least one of an underflow format and a overflow format; and setting the exponent field bits of the result to a second bit pattern if the format of the floating point operand is at least one of a zero format, an infinity format, and a NaN format.

25. The computer-readable medium of claim 24, wherein: the first bit pattern is representative of an overflow format.

26. The computer-readable medium of claim 24, wherein: the second bit pattern is representative of one of an infinity and a NaN format.

27. The computer-readable medium of claim 22, wherein setting the fraction field bits of the result comprises:

setting the fraction field bits of the result to zero if the format of the floating point operand is a normalized non-zero format and the magnitude of the unbiased exponent of the floating point operand is zero;

setting the fraction field bits of the result to a first bit pattern if the format of the floating point operand is at least one of an underflow format and a overflow format; and setting the fraction field bits of the result to fraction field bits of the floating point operand if the format of the floating point operand is at least one of an infinity format and a NaN format; and setting the fraction field bits of the result to zero with the exception that at least one bit of the fraction field bits is set to a first value to indicate a divide-by-zero status, if the format of the floating point operand is a zero format.

28. The computer-readable medium of claim 27, wherein: the first bit pattern is representative of an overflow format.

29. The computer-readable medium of claim 22, wherein setting the fraction field bits of the result comprises:

setting the fraction field bits of the result to zero if the format of the floating point operand is a normalized non-zero format and the magnitude of the unbiased exponent of the floating point operand equals zero;

setting the fraction field bits of the result to the fraction field bits of the floating point operand if the format of the floating point operand is at least one of an infinity format and a NaN format; and setting the fraction field bits of the result to zero and providing at least one status signal having a first value indicating a divide-by-zero status if the format of the floating point operand is a zero format.

30. The computer-readable medium of claim 17, wherein the set of instructions when executed further embeds status information in the result.

31. The computer-readable medium of claim 30, wherein embedding the status information in the result comprises:

setting at least one bit in the result to a first value to indicate a divide-by-zero status if the format of the floating point operand is a zero format.

32. The computer-readable medium of claim 30, wherein embedding the status information in the result comprises:

setting at least one bit of the result that stores the status information equivalent to a corresponding bit in the floating point operand that represents the status information.

33. A system for generating an integer part of a logarithm of a floating point operand comprising:

an operand analysis unit for analyzing a format of the floating point operand and generating at least one signal representative of the format;

a processing unit coupled to the operand analysis unit, the processing unit being operative to determine a magnitude of an unbiased exponent of the floating point operand as an intermediate result based on the at least one signal, determine an exponent field of the intermediate result, and determine a fraction field high part of the intermediate result; and a result generator coupled to the operand analysis unit and the processing unit, the result generator being operative to assemble a result equal to the integer part of the logarithm of the floating point operand based on the at least one signal, wherein, if the floating point operand is in at least one of a denormalized format, a normalized non-zero format, and a delimited format, an exponent field of the result equals the exponent field of the intermediate result and a fraction field high part of the result equals the fraction field high part of the intermediate result.

34. The system according to claim 33, wherein the floating point operand is in at least one of an underflow format and an overflow format.

35. The system according to claim 33, wherein status information is stored in the floating point operand and preserved by the result generator within the result.

36. The system according to claim 33, wherein the result generator is further operative to generate status information that is stored in the resulting operand.

* * * * *